(12) United States Patent
Negley et al.

(10) Patent No.: US 8,573,816 B2
(45) Date of Patent: Nov. 5, 2013

(54) COMPOSITE LENS WITH DIFFUSION

(75) Inventors: Gerald H. Negley, Chapel Hill, NC (US); Paul Pickard, Morrisville, NC (US)

(73) Assignee: Cree, Inc., Durham, NC (US)

(*) Notice: Subject to any disclaimer, the term of this patent is extended or adjusted under 35 U.S.C. 154(b) by 220 days.

(21) Appl. No.: 13/108,927

(22) Filed: May 16, 2011

(65) Prior Publication Data
US 2012/0236572 A1    Sep. 20, 2012

Related U.S. Application Data

(60) Provisional application No. 61/452,671, filed on Mar. 15, 2011.

(51) Int. Cl.
*F21V 5/00* (2006.01)
*H01L 33/42* (2010.01)

(52) U.S. Cl.
USPC .................. 362/362; 362/249.02; 362/231

(58) Field of Classification Search
USPC ........................................................ 362/326
See application file for complete search history.

(56) References Cited

U.S. PATENT DOCUMENTS

| | | | | |
|---|---|---|---|---|
| 6,373,615 B1* | 4/2002 | Mann et al. | | 359/241 |
| 7,872,716 B2* | 1/2011 | Nagai | | 349/119 |
| 8,177,408 B1* | 5/2012 | Coleman | | 362/615 |
| 2005/0270666 A1 | 12/2005 | Loh et al. | | |
| 2006/0263547 A1 | 11/2006 | Cojocariu et al. | | |
| 2009/0283779 A1 | 11/2009 | Negley et al. | | |
| 2010/0177509 A1 | 7/2010 | Pickard | | |
| 2011/0279015 A1* | 11/2011 | Negley et al. | | 313/501 |
| 2012/0025235 A1* | 2/2012 | Van De Ven et al. | | 257/98 |

FOREIGN PATENT DOCUMENTS

| | | |
|---|---|---|
| DE | 102008054029 A1 | 5/2010 |
| WO | 2007107916 A1 | 9/2007 |

OTHER PUBLICATIONS

International Search Report and Written Opinion for PCT/US2012/026743 mailed Jul. 19, 2012, 11 pages.
"Light Diffusers," Fusion Optix, 2 pages, accessed Jun. 20, 2012, http://www.fusionoptix.com/solutions/lighting/components/diffusers/formfactors.htm.

* cited by examiner

*Primary Examiner* — Peggy A. Neils
(74) *Attorney, Agent, or Firm* — Withrow & Terranova, PLLC

(57) ABSTRACT

The present disclosure relates to an enhanced composite lens, which is formed from a material, such as thermoplastic material. The thermoplastic material may be polycarbonate, acrylic glass, and the like. To form the composite lens, a resin of the desired thermoplastic material is formed in the desired shape of a lens. To facilitate light diffusion within the body of the resultant lens, diffusive additives are added to the thermoplastic resin when forming the composite lens. As such, the diffusive additives are dispersed throughout the body of the composite lens and light diffusion occurs volumetrically within and throughout the body of the composite lens.

30 Claims, 10 Drawing Sheets

COMPOSITE LENS WITH DIFFUSION

This application claims the benefit of U.S. Provisional Patent Application No. 61/452,671, filed Mar. 15, 2011, the disclosure of which is incorporated herein by reference in its entirety.

FIELD OF THE DISCLOSURE

The present disclosure relates to lighting fixtures, and in particular, to a composite lens that provides diffusion for a lighting fixture.

BACKGROUND

In recent years, a movement has gained traction to replace incandescent light bulbs with lighting fixtures that employ more efficient lighting technologies. One such technology that shows tremendous promise employs light emitting diodes (LEDs). Compared with incandescent bulbs, LED-based light fixtures are much more efficient at converting electrical energy into light and are longer lasting, and as a result, lighting fixtures that employ LED technologies are expected to replace incandescent bulbs in residential, commercial, and industrial applications.

Many of these lighting fixtures employ an array of LEDs, which emit light that is directed through a lens. To help mix the light that is emitted from the various LEDS in the array as well as to hide the LEDs from view, some form of diffusion is employed. Such diffusion may be provided by a separate diffuser that is placed adjacent the lens, applying a diffusive film to the lens, or applying a surface treatment to the lens. While performance of these diffusion techniques is acceptable, there are significant material and manufacturing costs associated with providing a separate diffuser and lens or applying a diffusive film or treatment to the surface of the lens. As such, there is a need for a composite lens that is capable of providing diffusion internally while maintaining the performance of the aforementioned diffusion techniques.

SUMMARY

The present disclosure relates to an enhanced composite lens, which is formed from a material, such as thermoplastic material. The thermoplastic material may be polycarbonate, acrylic glass, or the like. To form the composite lens, a resin of the desired thermoplastic material is formed in the desired shape of a lens. To facilitate light diffusion within the body of the resultant lens, diffusive additives are added to the thermoplastic resin when forming the composite lens. The diffusive additives are dispersed throughout the body of the composite lens and as such, light diffusion occurs volumetrically within and throughout the body of the composite lens.

Exemplary diffusion additives include Titanium Dioxide ($TiO_2$), Alumina ($Al_2O_3$), and the like. In respective embodiments, the diffusive additives have a particulate size of less than about 5 micrometers ($\mu m$), less than about 2.5 $\mu m$, less than about 1 $\mu m$, and less than about 0.5 $\mu m$ in diameter. The resulting composite lens, including the diffusive additives and any other additives, is configured to provide a color shift $\Delta u'v'$ of less than about 0.004, less than about 0.003, less than about 0.002, less than about 0.0015, and less than about 0.001 in respective embodiments. In addition to the diffusive additives, which facilitate light diffusion within the body of the resultant composite lens, the thermoplastic resin may include flame retardant additives, tinting additives, or a combination thereof.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

The present disclosure relates to a composite lens that internally provides diffusion for a solid-state lighting (SSL) fixture, such that a separate diffuser or diffusing film is not needed in conjunction with a transparent lens for diffusion of light exiting the lighting fixture. For context and ease of understanding, the following description first describes an exemplary solid state lighting fixture in which different diffusion technologies may be applied. Initially, the lighting fixture is described as having a diffuser that is separate from the lens. Once the lighting fixture with the separate diffuser and lens is described, alternative diffusing technologies, including the composite lens that provides diffusion, are discussed in detail.

Figure 1:
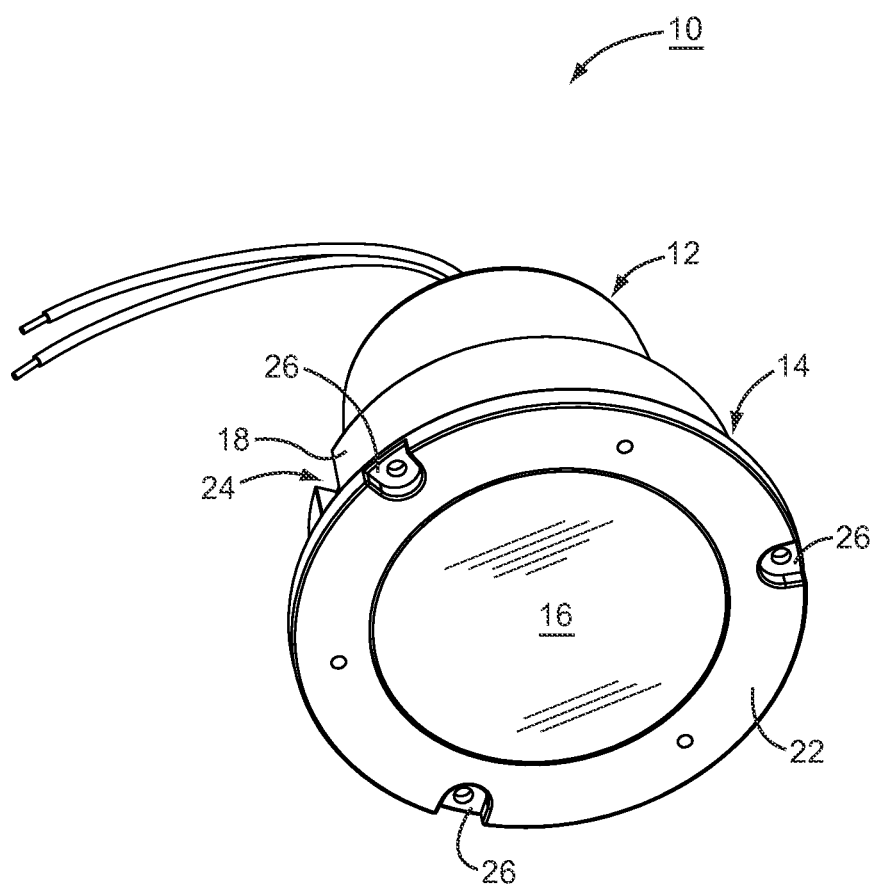
FIG. 1 is an isometric view of the front of the lighting fixture according to one embodiment of the disclosure.
Figure 2:
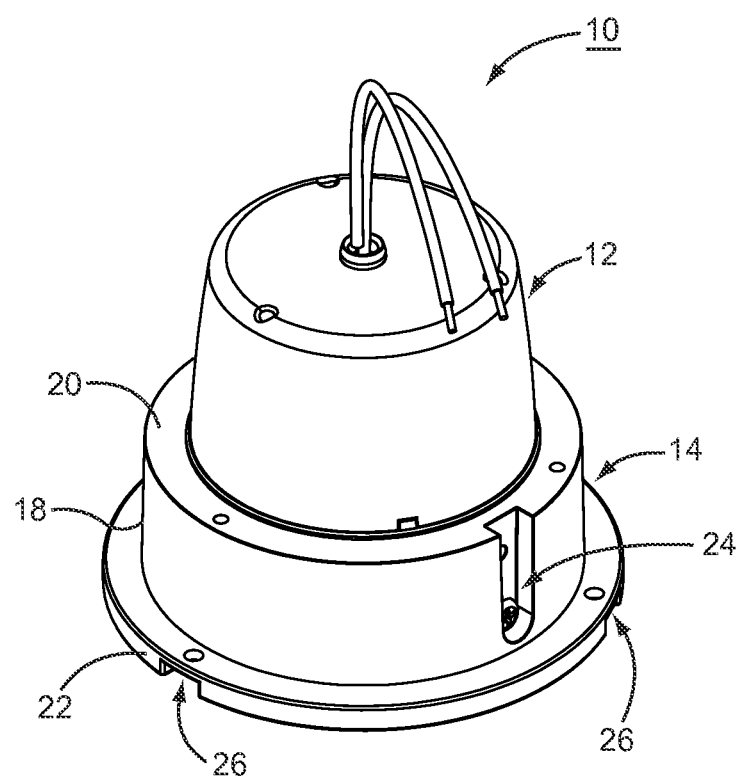
FIG. 2 is an isometric view of the back of the lighting fixture of FIG. 1.

With reference to FIGS. 1 and 2, a state-of-the-art lighting fixture 10 is illustrated according to one embodiment of the present disclosure. Further details regarding this particular lighting fixture may be found in co-assigned U.S. patent application Ser. No. 13/042,378, which was filed Mar. 7, 2011, and entitled LIGHTING FIXTURE, the disclosure of which is incorporated herein by reference in its entirety. While this particular lighting fixture 10 is used for reference, those skilled in the art will recognize that virtually any type of solid state lighting fixture may benefit from the subject lens of this disclosure.

As shown, the lighting fixture 10 includes a control module 12, a mounting structure 14, and a lens 16. The illustrated mounting structure 14 is cup-shaped and is capable of acting as a heat spreading device; however, different fixtures may include different mounting structures 14 that may or may not act as heat spreading devices. A light source (not shown), which will be described in detail further below, is mounted inside the mounting structure 14 and oriented such that light is emitted from the mounting structure through the lens 16. The electronics (not shown) that are required to power and drive the light source are provided, at least in part, by the control module 12. While the lighting fixture 10 is envisioned to be used predominantly in 4, 5, and 6 inch recessed lighting applications for industrial, commercial, and residential applications, those skilled in the art will recognize the concepts disclosed herein are applicable to virtually any size and application.

The lens 16 may include one or more lenses that are made of clear or transparent materials, such as polycarbonate or acrylic glass or any other suitable material. As discussed further below, the lens 16 may be associated with a diffuser for diffusing the light emanating from the light source and exiting the mounting structure 14 via the lens 16. Further, the lens 16 may also be configured to shape or direct the light exiting the mounting structure 14 via the lens 16 in a desired manner.

The control module 12 and the mounting structure 14 may be integrated and provided by a single structure. Alternatively, the control module 12 and the mounting structure 14 may be modular wherein different sizes, shapes, and types of control modules 12 may be attached, or otherwise connected, to the mounting structure 14 and used to drive the light source provided therein.

In the illustrated embodiment, the mounting structure 14 is cup-shaped and includes a sidewall 18 that extends between a bottom panel 20 at the rear of the mounting structure 14, and a rim, which may be provided by an annular flange 22 at the front of the mounting structure 14. One or more elongated slots 24 may be formed in the outside surface of the sidewall 18. There are two elongated slots 24, which extend parallel to a central axis of the lighting fixture 10 from the rear surface of the bottom panel 20 toward, but not completely to, the annular flange 22. The elongated slots 24 may be used for a variety of purposes, such as providing a channel for a grounding wire that is connected to the mounting structure 14 inside the elongated slot 24, connecting additional elements to the lighting fixture 10, or as described further below, securely attaching the lens 16 to the mounting structure 14.

The annular flange 22 may include one or more mounting recesses 26 in which mounting holes are provided. The mounting holes may be used for mounting the lighting fixture 10 to a mounting structure or for mounting accessories to the lighting fixture 10. The mounting recesses 26 provide for counter-sinking the heads of bolts, screws, or other attachment means below or into the front surface of the annular flange 22.

Figure 3:
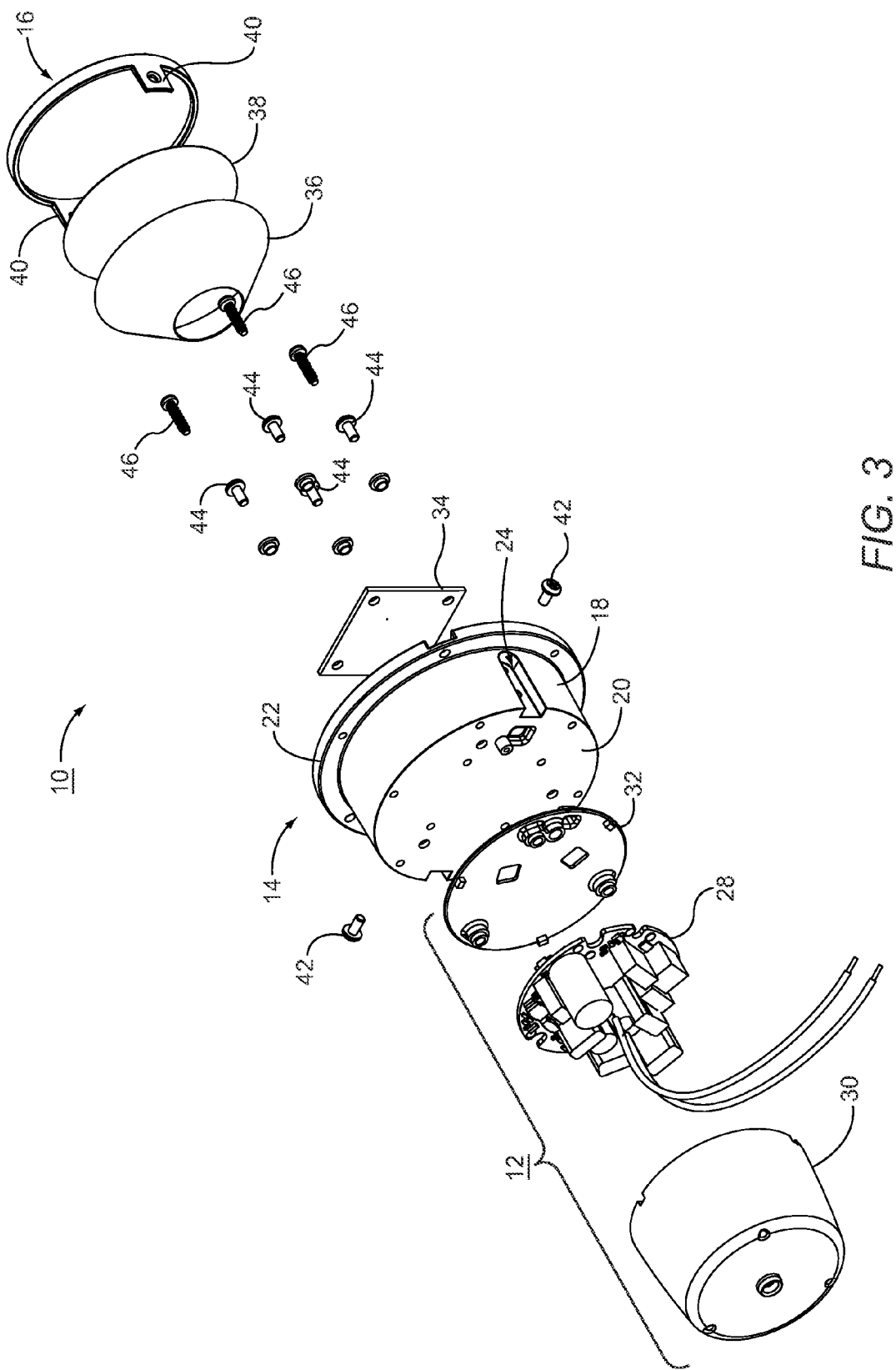
FIG. 3 is an exploded isometric view of the lighting fixture of FIG. 1.

With reference to FIG. 3, an exploded view of the lighting fixture 10 of FIGS. 1 and 2 is provided. As illustrated, the control module 12 includes control module electronics 28, which are encapsulated by a control module housing 30 and a control module cover 32. The control module housing 30 is cup-shaped and sized sufficiently to receive the control module electronics 28. The control module cover 32 provides a cover that extends substantially over the opening of the control module housing 30. Once the control module cover 32 is in place, the control module electronics 28 are contained within the control module housing 30 and the control module cover 32. The control module 12 is, in the illustrated embodiment, mounted to the rear surface of the bottom panel 20 of the mounting structure 14.

The control module electronics 28 may be used to provide all or a portion of power and control signals necessary to power and control the light source 34, which may be mounted on the front surface of the bottom panel 20 of the mounting structure 14 as shown, or in an aperture provided in the bottom panel 20 (not shown). Aligned holes or openings in the bottom panel 20 of the mounting structure 14 and the control module cover 32 are provided to facilitate an electrical connection between the control module electronics 28 and the light source 34. In an alternative embodiment (not shown), the control module 12 may provide a threaded base that is configured to screw into a conventional light socket wherein the lighting fixture resembles or is at least a compatible replacement for a conventional light bulb. Power to the lighting fixture 10 would be provided via this base.

In the illustrated embodiment, the light source 34 is solid state and employs one or more light emitting diodes (LEDs) and associated electronics, which are mounted to a printed circuit board (PCB) to generate light at a desired intensity and color temperature. The LEDs are mounted on the front side of the PCB while the rear side of the PCB is mounted to the front surface of the bottom panel 20 of the mounting structure 14 directly or via a thermally conductive pad (not shown). In this embodiment, the thermally conductive pad has a low thermal resistivity, and therefore, efficiently transfers heat that is generated by the light source 34 to the bottom panel 20 of the mounting structure 14.

While various mounting mechanisms are available, the illustrated embodiment employs four bolts 44 to attach the PCB of the light source 34 to the front surface of the bottom panel 20 of the mounting structure 14. The bolts 44 screw into threaded holes provided in the front surface of the bottom panel 20 of the mounting structure 14. Three bolts 46 are used to attach the mounting structure 14 to the control module 12. In this particular configuration, the bolts 46 extend through corresponding holes provided in the mounting structure 14 and the control module cover 32 and screw into threaded apertures (not shown) provided just inside the rim of the control module housing 30. As such, the bolts 46 effectively sandwich the control module cover 32 between the mounting structure 14 and the control module housing 30.

A reflector cone 36 resides within the interior chamber provided by the mounting structure 14. In the illustrated embodiment, the reflector cone 36 has a conical wall that extends between a larger front opening and a smaller rear opening. The larger front opening resides at and substantially corresponds to the dimensions of front opening in the mounting structure 14 that corresponds to the front of the interior chamber provided by the mounting structure 14. The smaller rear opening of the reflector cone 36 resides about and substantially corresponds to the size of the LED or array of LEDs provided by the light source 34. The front surface of the reflector cone 36 is generally, but not necessarily, highly reflective in an effort to increase the overall efficiency and optical performance of the lighting fixture 10. In certain embodiments, the reflector cone 36 is formed from metal, paper, a polymer, or a combination thereof. In essence, the reflector cone 36 provides a mixing chamber for light emitted from the light source 34 and may be used to help direct or control how the light exits the mixing chamber through the lens 16.

Figure 4:
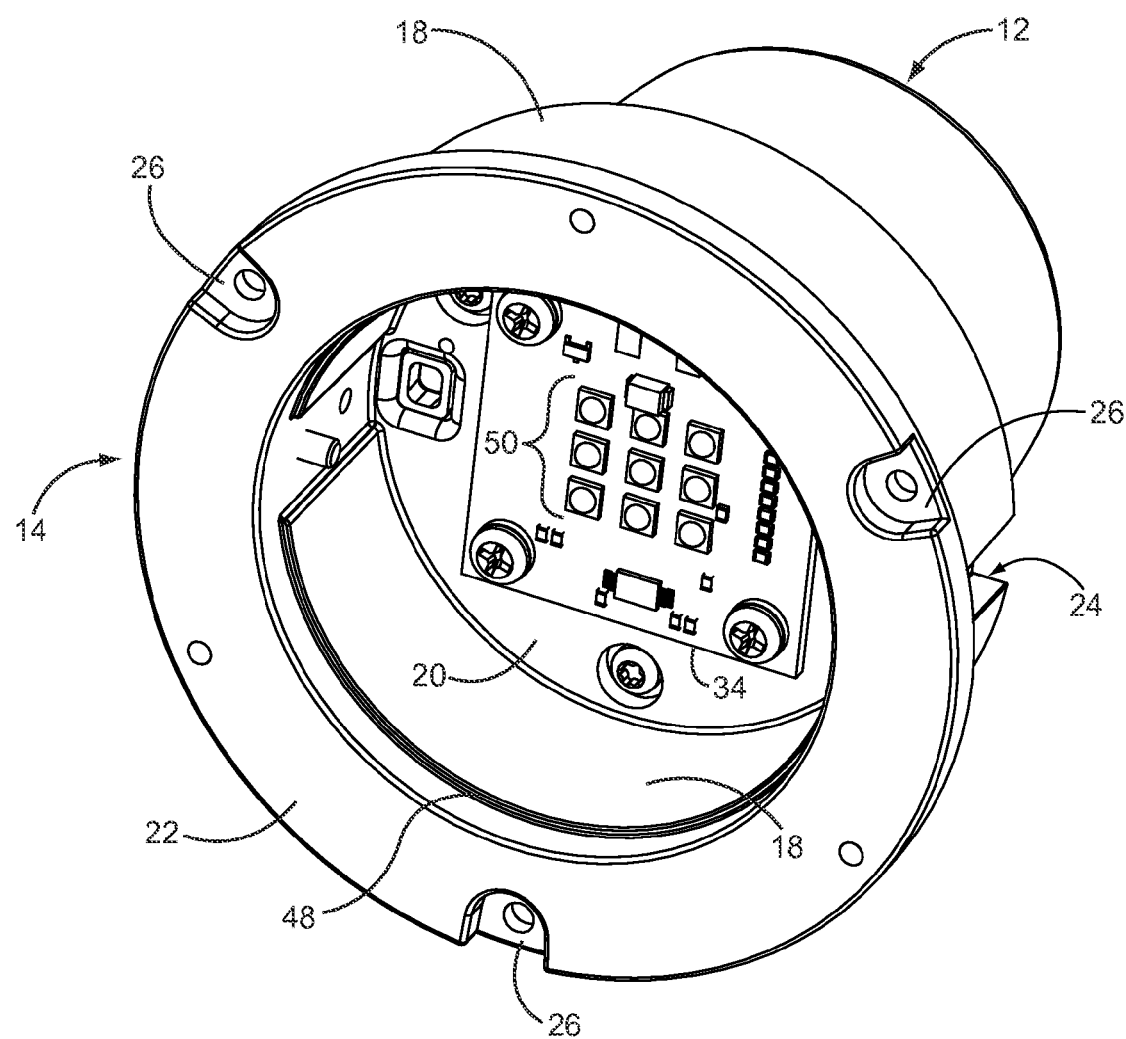
FIG. 4 is an isometric view of the front of the lighting fixture of FIG. 1 without the lens, diffuser, and reflector.
Figure 5:
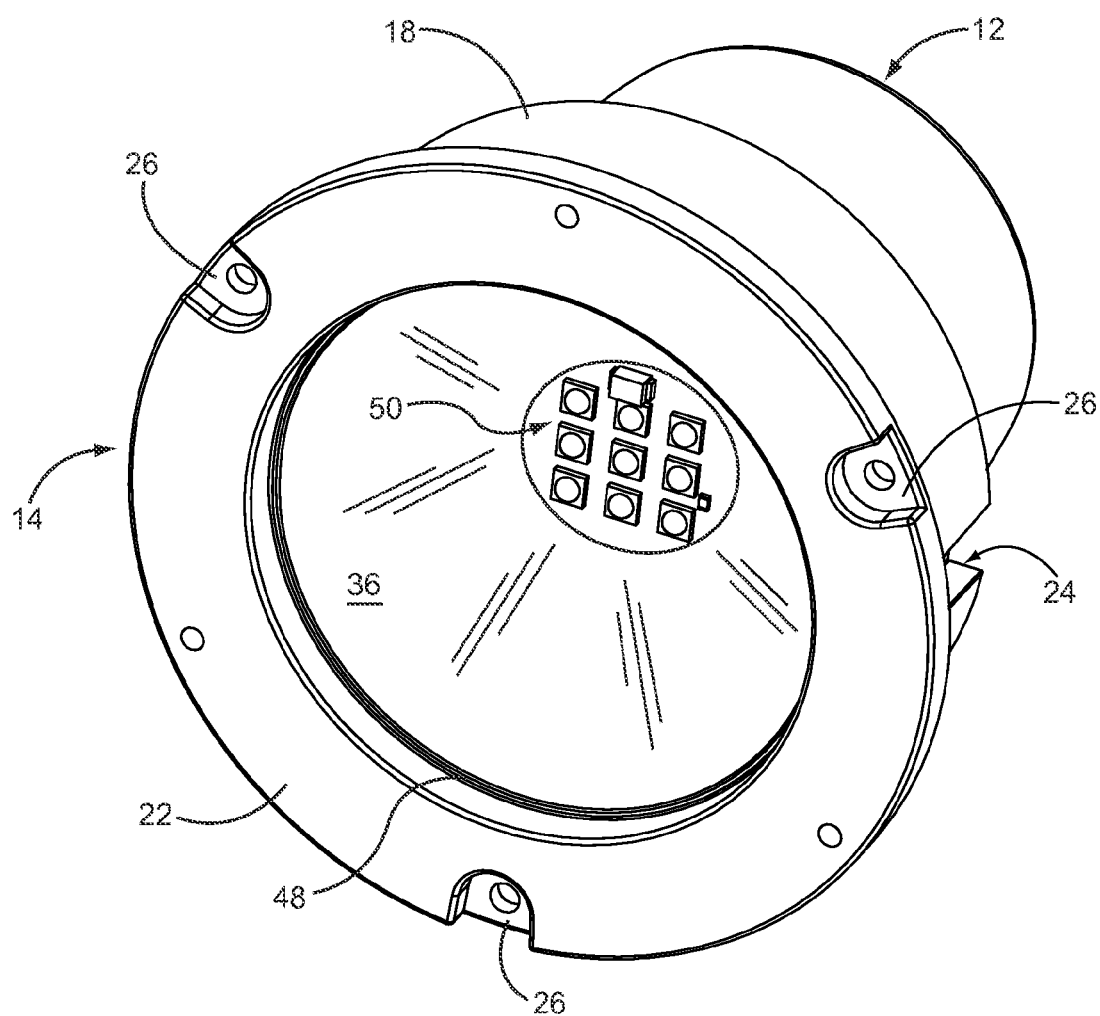
FIG. 5 is an isometric view of the front of the lighting fixture of FIG. 1 without the lens and diffuser.

When assembled, the lens 16 is mounted on or over the annular flange 22 and may be used to hold the reflector cone 36 in place within the interior chamber of the mounting structure 14 as well as hold additional lenses and one or more planar diffusers 38 in place. In the illustrated embodiment, the lens 16 and the diffuser 38 generally correspond in shape and size to the front opening of the mounting structure 14 and are mounted such that the front surface of the lens 16 is substantially flush with the front surface of the annular flange 22. As shown in FIGS. 4 and 5, a recess 48 is provided on the interior surface of the sidewall 18 and substantially around the opening of the mounting structure 14. The recess 48 provides a ledge on which the diffuser 38 and the lens 16 rest inside the mounting structure 14. The recess 48 may be sufficiently deep such that the front surface of the lens 16 is flush with the front surface of the annular flange 22.

Returning to FIG. 3, the lens 16 may include tabs 40, which extend rearward from the outer periphery of the lens 16. The tabs 40 may slide into corresponding channels on the interior surface of the sidewall 18 (see FIG. 4). The channels are aligned with corresponding elongated slots 24 on the exterior of the sidewall 18. The tabs 40 have threaded holes that align with holes provided in the grooves and elongated slots 24. When the lens 16 resides in the recess 48 at the front opening of the mounting structure 14, the holes in the tabs 40 will align with the holes in the elongated slots 24. Bolts 42 may be inserted through the holes in the elongated slots and screwed into the holes provided in the tabs 40 to affix the lens 16 to the mounting structure 14. When the lens 16 is secured, the diffuser 38 is sandwiched between the lens and the recess 48, and the reflector cone 36 is contained between the diffuser 38 and the light source 34. Alternatively, a retention ring (not shown) may attach to the flange 22 of the mounting structure 14 and operate to hold the lens 16 and diffuser 38 in place.

The degree and type of diffusion provided by the diffuser 38 may vary from one embodiment to another. Further, color, translucency, or opaqueness of the diffuser 38 may vary from one embodiment to another. Separate diffusers 38, such as that illustrated in FIG. 3, are typically formed from a polymer, glass, or thermoplastic, but other materials are viable and will be appreciated by those skilled in the art. Similarly, the lens 16 is planar and generally corresponds to the shape and size of the diffuser 38 as well as the front opening of the mounting structure 14. As with the diffuser 38, the material, color, translucency, or opaqueness of the lens 16 may vary from one embodiment to another. Further, both the diffuser 38 and the lens 16 may be formed from one or more materials or one or more layers of the same or different materials. While only one diffuser 38 and one lens 16 are depicted, the lighting fixture 10 may have multiple diffusers 38 or lenses 16.

Figure 6:
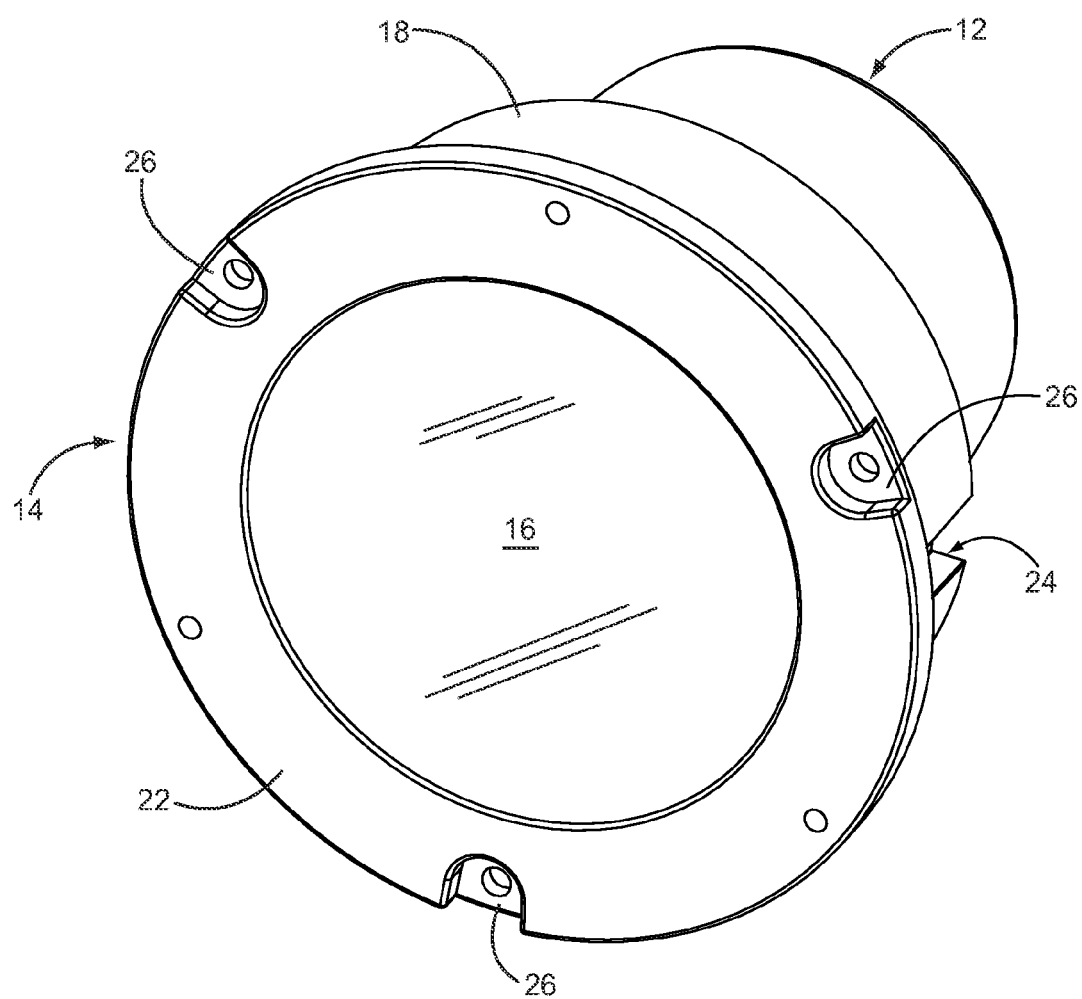
FIG. 6 is an isometric view of the front of the lighting fixture of FIG. 1 with the lens and diffuser.

For LED-based applications, the light source 34 provides an array of LEDs 50, as illustrated in FIG. 4. FIG. 4 illustrates a front isometric view of the lighting fixture 10, with the lens 16, diffuser 38, and reflector cone 36 removed, such that the light source 34 and the array of LEDs 50 are clearly visible within the mounting structure 14. FIG. 5 illustrates a front isometric view of the lighting fixture 10 with the lens 16 and diffuser 38 removed and the reflector cone 36 in place, such the array of LEDs 50 of the light source 34 are aligned with the rear opening of the reflector cone 36. As noted above, the volume inside the reflector cone 36 and bounded by the rear opening of the reflector cone 36 and the lens 16 or diffuser 38 provides a mixing chamber. FIG. 6 illustrates a front isometric view of the lighting fixture 10 with the lens 16 and diffuser 38 (not visible) in place.

Light emitted from the array of LEDs 50 is mixed inside the mixing chamber formed by the reflector cone 36 (not shown) and directed out through the lens 16 in a forward direction to form a light beam. The array of LEDs 50 of the light source 34 may include LEDs 50 that emit different colors of light. For example, the array of LEDs 50 may include both red LEDs that emit red light and blue-shifted yellow (BSY) LEDs that emit bluish-yellow light, wherein the red and bluish-yellow light is mixed to form "white" light at a desired color temperature.

For additional information, reference is made to co-assigned U.S. Pat. No. 7,213,940, which is incorporated herein by reference in its entirety. For a uniformly colored light beam, relatively thorough mixing of the light emitted from the array of LEDs 50 is desired. Both the reflector cone 36 and the diffusion provided by the diffuser 38 play a significant role in mixing the light emanated from the array of LEDs 50 of the light source 34.

In particular, certain light rays, which are referred to as non-reflected light rays, emanate from the array of LEDs 50 and exit the mixing chamber through the diffuser 38 and lens 16 without being reflected off of the interior surface of the reflector cone 36. Other light rays, which are referred to as reflected light rays, emanate from the array of LEDs of the light source 34 and are reflected off of the front surface of the reflector cone 36 one or more times before exiting the mixing chamber through the diffuser 38 and lens 16. With these reflections, the reflected light rays are effectively mixed with each other and at least some of the non-reflected light rays within the mixing chamber before exiting the mixing chamber through the diffuser 38 and the lens 16.

As noted above, the diffuser 38 functions to diffuse, and as result mix, the non-reflected and reflected light rays as they exit the mixing chamber, wherein the mixing chamber and the diffuser 38 provide the desired mixing of the light emanated from the array of LEDs 50 of the light source 34 to provide a light beam of a consistent color. In addition to mixing light rays, the lens 16 and diffuser 38 may be designed and the reflector cone 36 shaped in a manner to control the relative concentration and shape of the resulting light beam that is projected from the lighting fixture 10. For example, a first lighting fixture 10 may be designed to provide a concentrated beam for a spotlight, wherein another may be designed to provide a widely dispersed beam for a floodlight. From an aesthetics perspective, the diffusion provided by the diffuser 38 also prevents the emitted light from looking pixelated and obstructs the ability for a user to see the individual LEDs of the array of LEDs 50.

Figure 7:
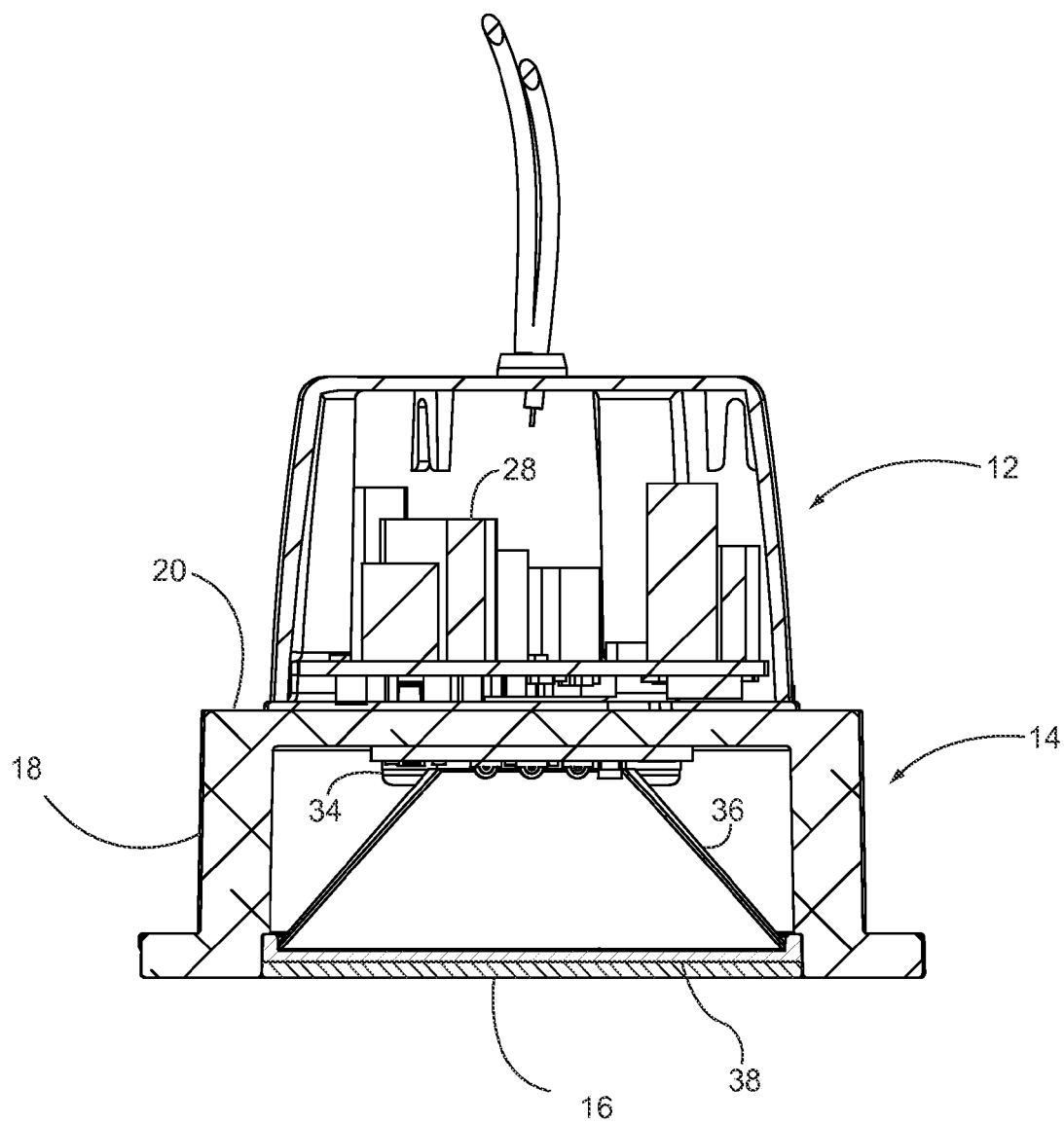
FIG. 7 is a cross sectional view of the lighting fixture of FIG. 5.

As provided in the above embodiment, the more traditional approach to diffusion is to provide a diffuser 38 that is separate from the lens 16. As such, the lens 16 is effectively transparent and does not add any intentional diffusion. The intentional diffusion is provided by the diffuser 38. In most instances, the diffuser 38 and lens 16 are positioned next to one another as shown in FIG. 7.

Figure 8:
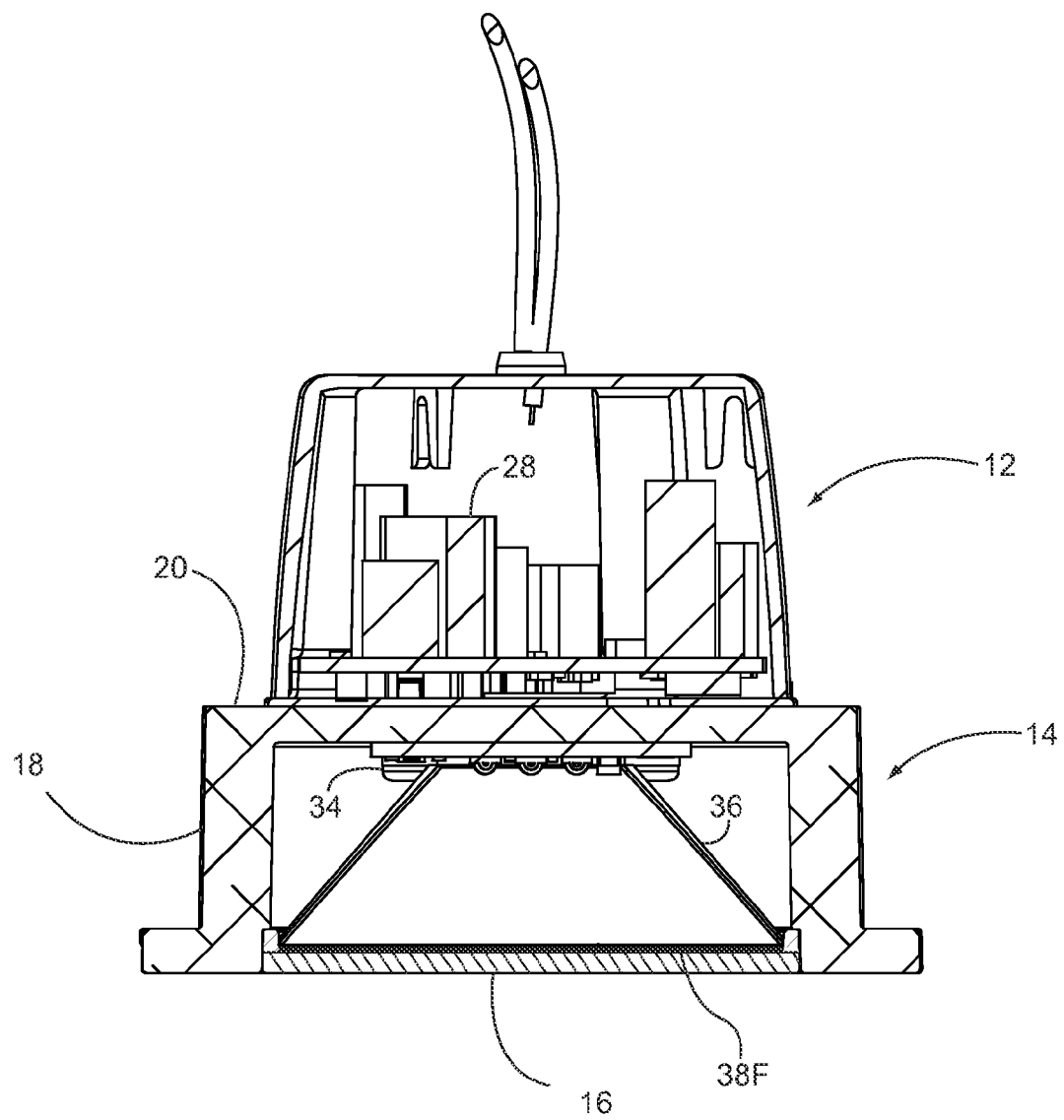
FIG. 8 is a cross sectional view of the lighting fixture of FIG. 5 wherein the diffuser is replaced with a diffusive film applied to the lens.

In an effort to minimize part counts and ease manufacturing complexity, certain diffusion designs have tried to apply a diffusion film 38F directly on one or both surfaces of the lens 16, as shown in FIG. 8. The diffusion film 38F is considered a "volumetric" film in which light diffusion occurs within the body of the diffusion film 38F. One exemplary diffusion film 38F is the ADF 3030 film provided by Fusion Optix, Inc. of 19 Wheeling Avenue, Woburn Mass. 01801, USA. While diffusion films 38F eliminate the need for a separate diffuser 38, there is still undesirable manufacturing and sourcing complexities associated with applying such films to the lens 16, especially when the diffusion films 38F and the lenses 16 are typically manufactured by different entities and have to be applied in a uniform and consistent fashion for performance and aesthetic reasons.

Figure 9:
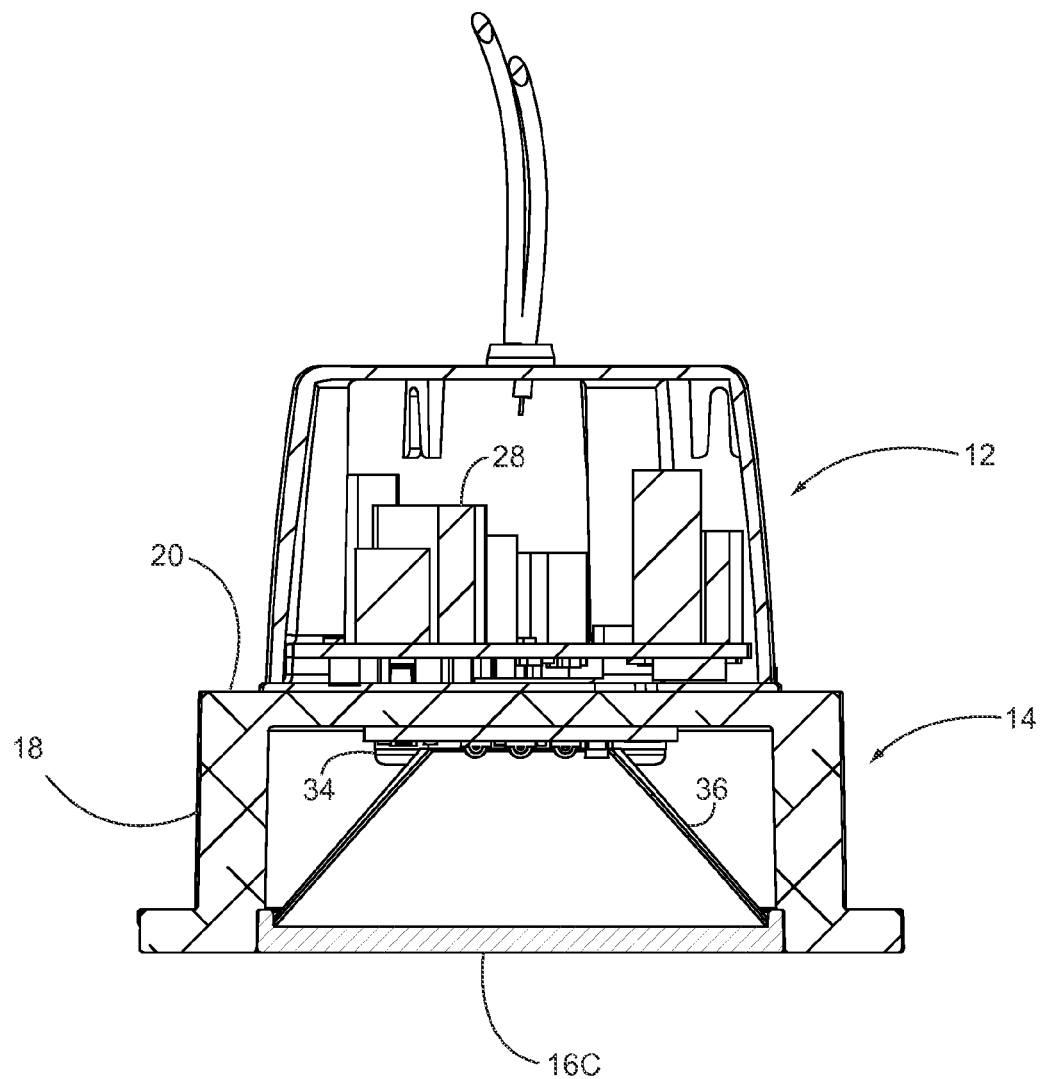
FIG. 9 is a cross sectional view of the lighting fixture of FIG. 5 wherein the diffuser and lens are replaced with a composite lens that provides volumetric diffusion.

To address these issues, attempts have been made to create a composite lens 16C, which provides the functions of both a traditional lens 16 and either a diffuser 38 or diffusion film 38F. A composite lens 16C is shown in FIG. 9 and typically will not require an additional diffuser 38, diffusion film 38F, or lens 16. However, providing a secondary lens 16 is not counter to the present disclosure. The composite lens 16C is a volumetric lens, which means the light passing through the composite lens 16C is diffused in the body of the composite lens 16C. While the composite lens 16C does appear to minimize part counts and ease manufacturing complexity, applicants have discovered that the optical performance of available composite lenses 16C, and in particular those made from polycarbonate, are inadequate for lighting fixtures 10 that employ LEDs as the light source 34. While separate diffusers 38 and select diffusion films 38F may provide adequate optical performance, existing composite lenses 16C do not perform in a desired fashion.

The most deficient optical performance parameter for existing composite lenses 16C is color shift. While separate diffusers 38 and select diffusion films 38F may constrain color shift within reasonable bounds, existing composite lenses 16C do not. In fact, the color shift imposed by existing composite lenses 16C has been determined to typically run up to five (5) or more times that of separate diffusers 38 and select diffusion films 38F. These color shifts injected by the composite lenses 16C are problematic for a variety of reasons.

First, any color shift imposed by the composite lens 16C causes the light exiting the lighting fixture 10 to differ in color from that emitted from the light source 34. Generally, the light source 34 is designed to emit light at a color temperature desired for the lighting fixture 10 in general. Assuming that the lighting fixture 10 should emit light at 2700K, the array of LEDs 50 is designed to emit light at 2700K. However, a color shift imposed by the composite lens 16C may undesirably shift the 2700K light that is emitted from the light source 34 to an undesirable color temperature, such as 2600K.

In certain lighting fixtures 10, the color of the light emitted from the array of LEDs 50 can be controlled in different ways. During manufacture, the LEDs for the array of LEDs 50 may be specially selected to ensure that the overall light output of the array of LEDs 50 provides light within a specified color range. In more sophisticated lighting fixtures 10, the control module electronics 28 can control the drive signals provided to the various LEDs of the array of LEDs 50 to effectively tune the emitted light to a desired color. Such tuning is typically done individually for each lighting fixture 10 during the manufacturing process.

For example, assume the array of LEDs 50 includes BSY and red LEDs. Further, assume that the control module electronics 28 and the array of LEDs 50 are configured to have significant control of the output of the red LEDs, but have only limited or no control over the output of the BSY LEDs. In this instance, tuning the output of the red LEDs may compensate for relatively significant color shifts along the red spectrum that are imposed by the composite lens 16C. However, significant color shifts along the blue- yellow color spectrum that are imposed by the composite lens 16C are problematic because the color shift along the blue- yellow spectrum cannot be tuned by the control module electronics 28 and the array of LEDs 50 sufficiently to compensate for the color shift.

Even if the control module electronics 28 and the array of LEDs 50 provided tuning along the blue-yellow spectrum, there are always limitations to the degree to which color shifts imposed by the composite lens 16C can be compensated. In certain cases, various LEDs of the same color type (BSY or red) must be tested and classified according to actual range of color output. Once classified, the LEDs may be selected based on how much color shift is imposed by the composite lens 16C and how much color tuning is made possible by the control module electronics 28 and the array of LEDs 50 once the selected LEDs are employed. In essence, color shifts imposed by the composite lens 16C must be addressed by laborious selection processes, design processes, tuning processes, or a combination thereof. Reducing the color shift imposed by the composite lens 16C would increase the ease of design and manufacturing as well as the performance of the lighting fixture 10.

Figure 10:
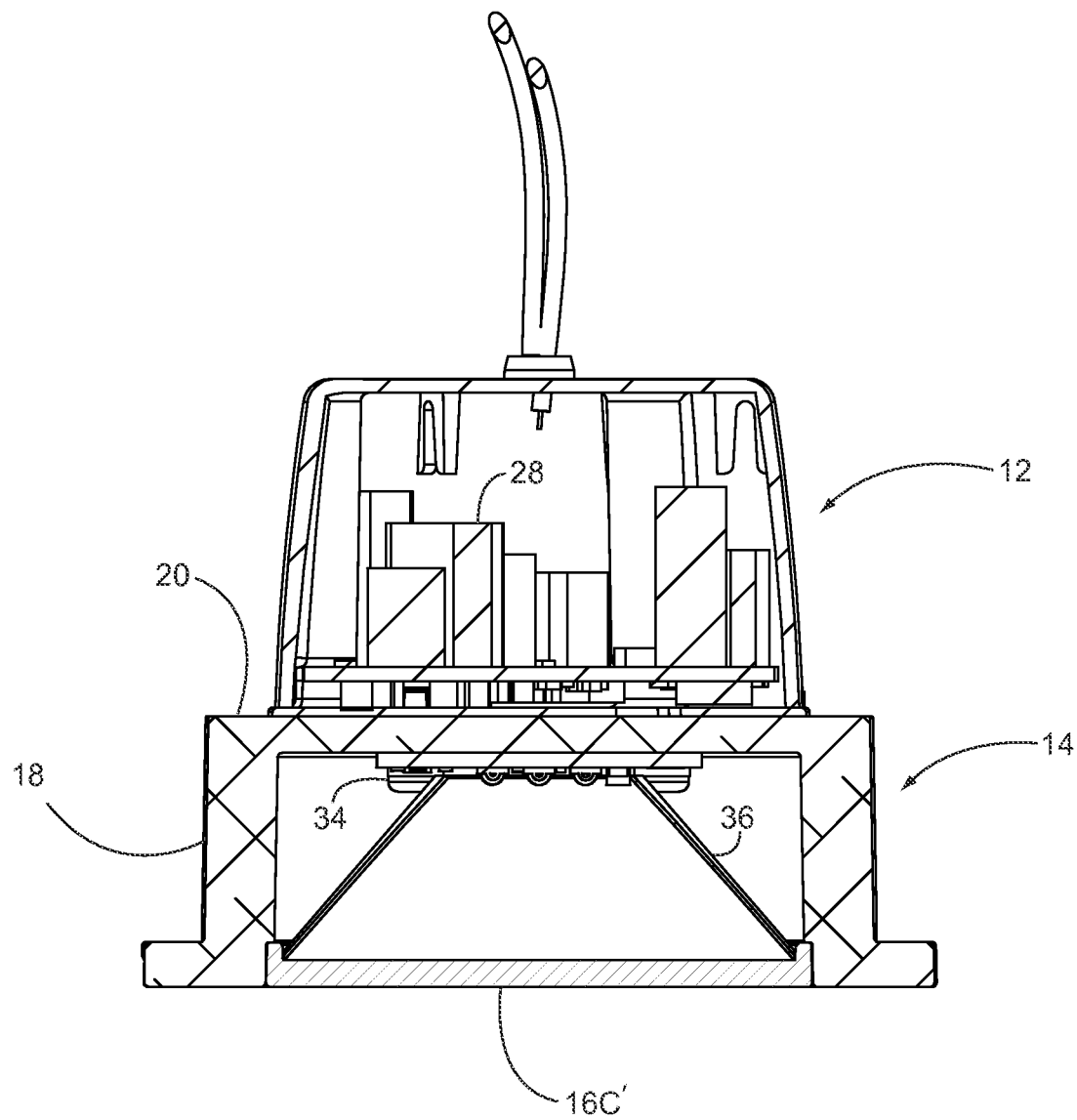
FIG. 10 is a cross sectional view of the lighting fixture of FIG. 5 wherein the diffuser and lens are replaced with an enhanced composite lens that provides volumetric diffusion according to one embodiment of the present disclosure.

As illustrated in FIG. 10, the present disclosure provides an enhanced composite lens 16C' that is formed to significantly reduce color shift with respect to existing volumetric lenses. Color shift is best quantified based on a color space model. Various color space models are available to classify colors and to qualify them according to such attributes as hue, saturation, chroma, lightness, or brightness. The Commission Internationale de l'Eclairage (International Commission on Illumination or "CIE") is a leading organization for standardizing color space models, and the CIE color models are highly influential systems for measuring color, and more importantly for this application, distinguishing different colors. The color models generally represent the range of all visible colors in a horseshoe-shaped color space. The color space is set in a grid that uses chromaticity coordinates as a locator for any value of hue and chroma for a particular color in the visible color space. These color models are effectively uniform chromaticity scale diagrams, the most prominent of which is the 1976 CIE u', v' Chromaticity Diagram that employs the chromaticity coordinates u', v' to represent hue and chroma for a particular color.

A convenient and effective measure of the color shift imposed by a medium, such as the diffuser 38, diffusion film 38F, or a composite lens 16C, 16C' is to determine the difference in the chromaticity coordinates $u'_{before}$, $v'_{before}$ of light before passing through a medium and the chromaticity coordinates $u'_{after}$, $v'_{after}$ of light after passing through the medium. As such, the color shift $\Delta u'v'$ imposed by the medium may be represented as $\Delta u'v' = |u'_{before}, v'_{before} - u'_{after}, v'_{after}|$.

For reference, the color shift $\Delta u'v'$ of a well designed diffuser 38 that is formed from an acrylic glass, or a lens 16 with a diffusion film 38F may be less than about 0.002 and in exceptional cases as little as 0.001. However, available composite lenses 16C formed from a polycarbonate have a $\Delta u'v'$ of around 0.005 or greater, which represents a very large color shift for which it is difficult to compensate during manufacturing, even with proper LED selection and sophisticated on-board tuning capabilities in the lighting fixture 10.

With continued reference to FIG. 10, the enhanced composite lens 16C' of the present disclosure is a volumetric lens, which is formed from a thermoplastic material. The thermoplastic material may be polycarbonate; poly(methyl methacrylate) (PMMA), which is commonly referred to as acrylic glass; cyclic olefin polymer, polyarylate, or styrene acrylonitrile (SAN). To form the composite lens 16C', a resin of the desired thermoplastic material, such as polycarbonate, is formed in the desired shape of a lens. To facilitate light diffusion within the body of the resultant composite lens 16C', diffusive additives are added to the thermoplastic resin when forming the composite lens 16C'. As such, the diffusive additives are dispersed throughout the body of the composite lens 16C' and light diffusion occurs volumetrically within and throughout the body of the composite lens 16C'.

Exemplary diffusion additives include Titanium Dioxide ($TiO_2$), and Alumina ($Al_2O_3$), as well as other types of particles that are either reflective or have differing indices of refraction. In respective embodiments, the diffusive additives have a particulate size of less than about 5 micrometers (μm), less than about 2.5 μm, less than about 1 μm, and less than about 0.5 μm, wherein all measurements correspond to the average diameter of the particles. For the purposes of this disclosure, a diffusing lens is defined as one that provides at least a 10° full-width half-maximum diffusion angle or light beam spread. In select embodiments, the diffusion provides at least a 30° full-width half-maximum diffusion angle, or light beam spread.

The resulting composite lens 16C', including the diffusive additives and any other additives, such as those described below, is configured to provide a color shift Δu'v' of less than about 0.004, less than about 0.003, less than about 0.002, and less than about 0.0015, and less than about 0.001 in respective embodiments. As such, the color shift imposed by the composite lens 16C' is much better than currently available lenses of similar type and meets or exceeds the color shifts Δu'v' imposed by currently available diffusers 38 and lenses 16 that employ diffuser films 38F.

For systems that are more tolerant to color shifts in a first direction of the chromaticity diagram than a second direction, the composite lens 16C' may be designed to be more restrictive for color shifts in the second direction than the first direction. For example, assume that a lighting fixture 10 incorporates BSY and red LEDs in the LED array 50 and that the output of the red LEDs is highly tunable relative to the output of the BSY LEDs. As such, changes in the v' parameter (Δv') are not tolerated well while changes in the u' parameter (Δu') are more tolerable. The composite lens 16C' may be configured to provide a color shift Δv' of less than about 0.003, less than about 0.002, less than about 0.001, and less than about 0.0005 in respective embodiments. Correspondingly, the color shift Δu' may be configured to be greater (or less) than about 0.003, greater (or less) than about 0.002, greater (or less) than about 0.001, and greater (or less) than about 0.0005 in these respective embodiments. In another embodiment, the composite lens 16C' may be configured to provide a color shift Δu' of less than about 0.003, less than about 0.002, less than about 0.001, and less than about 0.0005 in respective embodiments. Correspondingly, the color shift Δv' may be configured to be greater (or less) than about 0.003, greater (or less) than about 0.002, greater (or less) than about 0.001, and greater (or less) than about 0.0005 in these respective embodiments. The color shift Δu' may be represented as $\Delta u' = |u'_{before} - u'_{after}|$. The color shift Δv' may be represented as $\Delta v' = |v'_{before} - v'_{after}|$.

In addition to the diffusive additives, which facilitate light diffusion within the body of the resultant composite lens 16C', the thermoplastic resin may include flame retardant additives, tinting additives, or a combination thereof. Exemplary flame retardant additives include anti-dripping agents, antimony oxides, brominated compounds, fluorinated compounds, and phosphorous compounds. The flame retardant additives cause the composite lens 16C' to be flame retardant. In respective embodiments, the flame retardant additives have a particulate size of less than about 5 micrometers (μm), less than about 2.5 μm, less than about 1 μm, and less than about 0.5 μm. In respective embodiments, sufficient flame retardant additives are added to the thermoplastic resin to allow the composite lens 16C' to pass UL's (Underwriters Laboratories Inc.) plastic flammability standards UL94 V0 and UL94 5VA, as defined at the priority date of the present application.

In one embodiment, the thermoplastic resin does not include tinting additives, such that color absorption in the resultant composite lens 16C' is minimized. Minimizing color absorption generally minimizes color shifting. If tinting additives are added, the tinting additives should be selected and added in quantities that minimize color absorption at colors where tuning is limited or not available. For example, if blue color shifts are not tolerated well, no blue tinting additives are added to the thermoplastic resin.

In select embodiments, the molecular structure of the thermoplastic polymer, such as polycarbonate, is modified to minimize the absorption of certain primary color ranges, such as blue, red, and green. For example, when the LEDs of the LED array 50 include BSY and red LEDs, the molecular structure of the polycarbonate may be modified to absorb less blue light than the unmodified molecular structure of polycarbonate. The modified polycarbonate structure may include be a high performance copolymer of polycarbonate. Notably, the composite lens 16C' of the present disclosure is applicable for light sources that include OLEDS (Organic Light Emitting Diodes) or those LEDs whose natural color is altered by application of a desired coating, such as a down-converting phosphor coating like that disclosed in U.S. Pat. No. 6,600, 175, which is incorporated herein by reference in its entirety, or spectrally selective coating (e.g., filter). All particulate sizes correspond to average particulate dimensions.

Those skilled in the art will recognize improvements and modifications to the embodiments of the present disclosure. All such improvements and modifications are considered within the scope of the concepts disclosed herein.

What is claimed is:

1. A composite lens that provides diffusion for a lighting fixture comprising a material formed in a shape of a lens and a diffusive additive distributed substantially throughout the material wherein a color shift of light passing through the lens is associated with a Δu'v' of less than about 0.004, wherein Δu'v' is defined as $\Delta u'v' = |u'_{before}, v'_{before} - u'_{after}, v'_{after}|$ where $u'_{before}, v'_{before}$ are chromaticity coordinates of light before passing through the lens and $u'_{after}, v'_{after}$ are chromaticity coordinates of light after passing through the lens.

2. The composite lens of claim 1 wherein the material is a thermoplastic material.

3. The composite lens of claim 2 wherein the light passing through the lens is diffused volumetrically.

4. The composite lens of claim 1 wherein the color shift of the light passing through the lens is associated with a u'v' of less than about 0.003.

5. The composite lens of claim 2 wherein the diffusive additive comprises at least titanium dioxide.

6. The composite lens of claim 2 wherein the diffusive additive comprises at least alumina.

7. The composite lens of claim 2 wherein the diffusive additive is a particulate material having an average particulate size of less than about five (5) micrometers in diameter.

8. The composite lens of claim 2 wherein the light passing through the lens is diffused by at least a 10° full-width half-maximum diffusion angle.

9. The composite lens of claim 2 further comprising a flame retardant additive distributed substantially throughout the thermoplastic material.

10. The composite lens of claim 2 wherein the thermoplastic material is polycarbonate.

11. The composite lens of claim 10 wherein the polycarbonate is a modified copolymer of polycarbonate that is modified to substantially not absorb blue light.

12. The composite lens of claim 2 wherein the thermoplastic material comprises essentially no tinting additives.

13. The composite lens of claim 2 wherein the thermoplastic material comprises essentially no blue tinting additives.

14. A composite lens that provides diffusion for a lighting fixture comprising a material formed in a shape of a lens and a diffusive additive distributed substantially throughout the material wherein a color shift of light passing through the lens is associated with a $\Delta v'$ of less than about 0.003, wherein $\Delta v'$ is defined as $\Delta v' = |v'_{before} - v'_{after}|$ where $v'_{before}$ is a chromaticity coordinate of light before passing through the lens and $v'_{after}$ is a chromaticity coordinate of light after passing through the lens.

15. The composite lens of claim 14 wherein the material is a thermoplastic material.

16. The composite lens of claim 15 wherein the color shift of the light passing through the lens is associated with a $\Delta u'$ of greater than about 0.003.

17. The composite lens of claim 15 wherein the light passing through the lens is diffused volumetrically.

18. The composite lens of claim 15 wherein the diffusive additive comprises at least titanium dioxide.

19. The composite lens of claim 15 wherein the diffusive additive comprises at least alumina.

20. The composite lens of claim 15 wherein the diffusive additive is a particulate material having an average particulate size of less than about five (5) micrometers in diameter.

21. The composite lens of claim 15 wherein the light passing through the lens is diffused by at least a 10° full-width half-maximum diffusion angle.

22. A composite lens that provides diffusion for a lighting fixture comprising a material formed in a shape of a lens and a diffusive additive distributed substantially throughout the material wherein a color shift of light passing through the lens is associated with a $\Delta u'$ of less than about 0.003, wherein $\Delta u'$ is defined as $\Delta u' = |u'_{before} - u'_{after}|$ where $u'_{before}$ is a chromaticity coordinate of light before passing through the lens and $u'_{after}$ is a chromaticity coordinate of light after passing through the lens.

23. The composite lens of claim 22 wherein the material is a thermoplastic material.

24. The composite lens of claim 23 wherein the color shift of the light passing through the lens is associated with a $\Delta v'$ of greater than about 0.003.

25. The composite lens of claim 23 wherein the light passing through the lens is diffused volumetrically.

26. The composite lens of claim 23 wherein the diffusive additive comprises at least titanium dioxide.

27. The composite lens of claim 23 wherein the diffusive additive comprises at least alumina.

28. The composite lens of claim 23 wherein the diffusive additive is a particulate material having an average particulate size of less than about five (5) micrometers in diameter.

29. The composite lens of claim 23 wherein the light passing through the lens is diffused by at least a 10° full-width half-maximum diffusion angle.

30. A solid state lighting fixture comprising a composite lens and an LED-based light source wherein light emitted from the LED-based light source is directed through the composite lens, and the composite lens comprises a material formed in a shape of a lens and a diffusive additive distributed substantially throughout the material wherein a color shift of light passing through the lens is associated with a $\Delta u'v'$ of less than about 0.004, wherein $\Delta u'v'$ is defined as $\Delta u'v' = |u'_{before}, v'_{before} - u'_{after}, v'_{after}|$ where $u'_{before}, v'_{before}$ are chromaticity coordinates of light before passing through the lens and $u'_{after}, v'_{after}$ are chromaticity coordinates of light after passing through the lens.

* * * * *